No. 621,810. J. GILSON. Patented Mar. 28, 1899.
GRINDING MACHINE.
(Application filed Apr. 4, 1898.)
(No Model.)
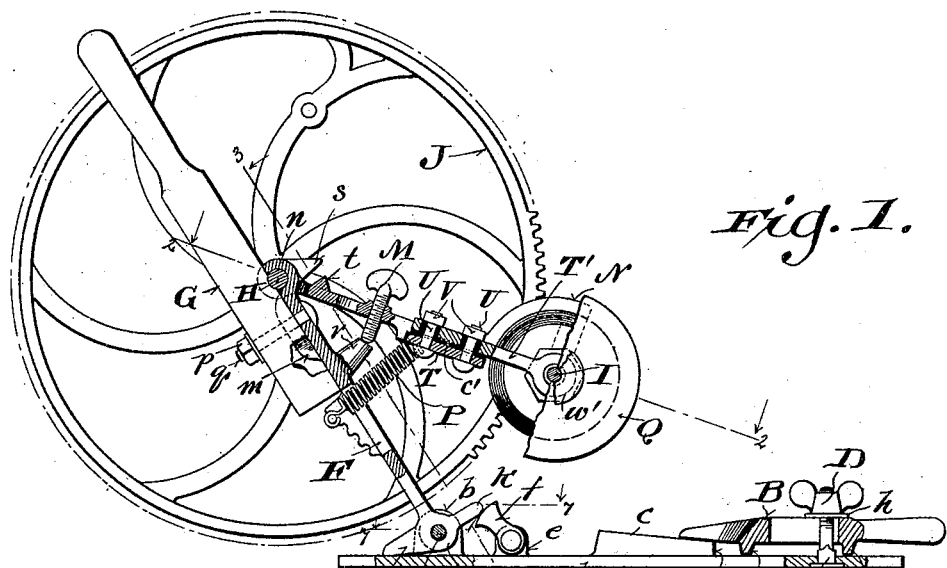
Fig. 1.
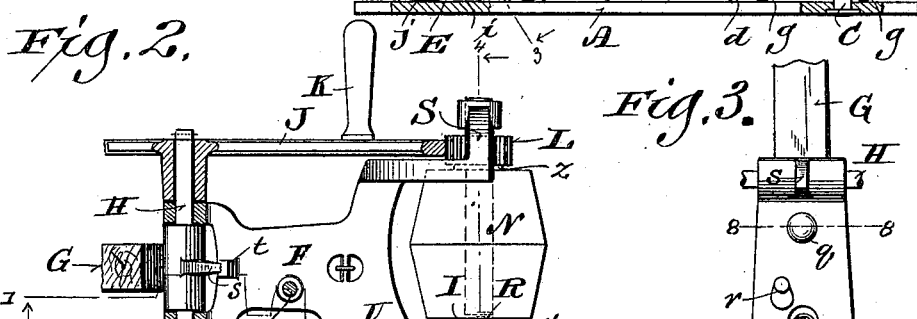
Fig. 2. Fig. 3.
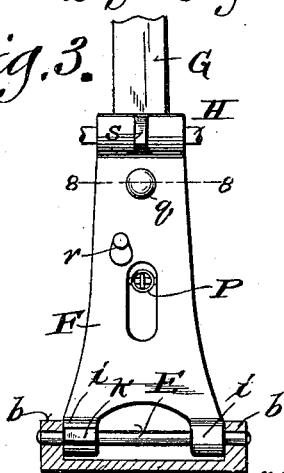
Fig. 8.
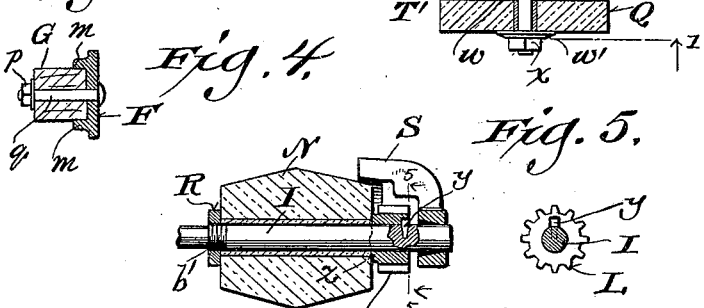
Fig. 4. Fig. 5. Fig. 7.
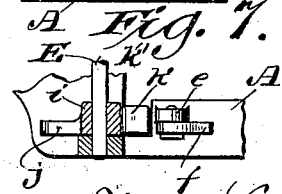
Fig. 6.
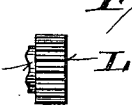
Witnesses:
Geo. W. Young,
N. E. Oliphant
Inventor:
John Gilson.
By H. G. Underwood
Attorney
THE NORRIS PETERS CO., PHOTO-LITHO., WASHINGTON, D. C.

UNITED STATES PATENT OFFICE.

JOHN GILSON, OF PORT WASHINGTON, WISCONSIN, ASSIGNOR TO THE GILSON MANUFACTURING COMPANY, OF SAME PLACE.

GRINDING-MACHINE.

SPECIFICATION forming part of Letters Patent No. 621,810, dated March 28, 1899.

Application filed April 4, 1898. Serial No. 676,265. (No model.)

*To all whom it may concern:*

Be it known that I, JOHN GILSON, a citizen of the United States, and a resident of Port Washington, in the county of Ozaukee and State of Wisconsin, have invented certain new and useful Improvements in Grinding-Machines; and I do hereby declare that the following is a full, clear, and exact description thereof.

My invention has for its especial object to simplify and cheapen the manufacture of grinding-machines having the same general characteristics of the one set forth in United States Patent No. 593,964, issued November 16, 1897. It therefore consists in certain peculiarities of construction and combination of parts, hereinafter specified with reference to the accompanying drawings and subsequently claimed.

Figure 1 of the drawings represents a side elevation of my improved grinding-machine, partly in vertical longitudinal section, as indicated by line 1 1 in the succeeding figure; Fig. 2, a detail plan view, partly in section, as indicated by line 2 2 in the preceding figure; Fig. 3, a front elevation of a portion of the machine, partly in section, as indicated by line 3 3 in the first-described figure; Fig. 4, a detail sectional view indicated by line 4 4 in the second figure; Fig. 5, a detail side elevation, partly in transverse section, indicated by line 5 5 in the fourth figure; Fig. 6, a front elevation of a pinion embodied in the machine; Fig. 7, a detail plan view, partly in horizontal section, as indicated by line 7 7 in said first figure; and Fig. 8, a detail sectional view indicated by line 8 8 in the third figure.

Referring by letter to the drawings, A represents the base of my improved machine, this base being preferably of cast metal and provided with the upper lugs $b$, longitudinally-inclined knife-rests $c$, and a transverse sickle-bar abutting-ledge $d$, common in the class of grinding-machines to which my improvements relate.

As one of the features of my improvement, the base A is provided with an upper lug $e$, to which a dog $f$ is pivotally connected, the function of this dog being hereinafter set forth.

The horizontal sickle-bar clamp-plate B in this instance is provided with a longitudinally-slotted forwardly-extended central handle, and depending from said plate and handle are supporting-lugs $g$, the handle-lug serving as a fulcrum upon which to tilt the aforesaid plate. In practice there are two of the lugs $g$ depending from the clamp-plate, and the handle-lug is on a line intermediate of those pertaining to said plate; but the latter being in section in Fig. 1 only two of the three lugs employed to constitute corners of a triangle are shown.

The under side of the base is provided with a countersink for the head of an angular shank-bolt C, fitting a corresponding opening in said base, this bolt being extended up through a slot in the handle of the clamp-plate B to engage a washer $h$ and set-nut D, said bolt constituting the pivot for said handle. The bolt is substituted for the pivot-stud set forth in the aforesaid patent and can be readily replaced if broken, worn, or lost, and no increased thickness of machine-base in front of the transverse ledge $d$ is necessary.

The base-lugs $b$ support the pivot-rod E, extending through the depending lugs $i$ of the tilt-plate F, having a handle G in bolt connection therewith. The tilt-plate is herein shown provided with a rear lug $j$ and a front lug $k$ at one of its lower corners, the first of these lugs serving as a stop to limit rearward swing of said plate on its pivot. The other of said lugs comes in position to be opposed by the dog $f$, when the tilt-plate has its full throw to the rear, whereby this plate may be held against incidental forward movement.

A rear stop-lug on the tilt-plate has been set forth in the above-named patent; but the front lug $k$ of said plate and the pivoted dog herein shown are designed to take the place of the tilt-plate ear and base-opposing stop-screw that are also set forth in the aforesaid patent, the new construction and arrangement of parts being more economical and practical.

The tilt-plate is provided with a pair of longitudinal rear flanges $m$, flanking the handle G, and by employment of these flanges only one bolt is necessary to the securing of said handle to said plate, the latter being herein shown as having its upper end in the form of an elongated hook n instead of the boss shown in the aforesaid patent. Engaging the hook n is a rod H, clamped tight against handle G by the adjustment of nut p on bolt q, whereby the rod-opposing set-screw of the former patent is rendered unnecessary and the manufacture of the machine proportionately cheapened. The rod constitutes the pivot for a two-part frame that differs in detail from the one shown in the former patent and constitutes a carrier for the grinding-wheel arbor I, hereinafter more particularly specified. Said rod also constitutes an arbor for the loose spur-wheel J of the machine, this spur-wheel being provided with a crank-handle K and having mesh with a pinion L on the arbor I aforesaid.

Like in the former patent the tilt-plate is provided with a forward stud r, opposed to a set-screw M, adjustable in the pivotal frame to set the latter so as to insure of the grinding-wheel N on arbor I coming properly on its work, it being understood that said tilt-plate and frame move together when the handle G is operated and that said grinding-wheel is of conical form in opposite directions from its longitudinal center.

In the present showing a stop-lug s extends forward from the tilt-plate hook n to oppose a spur t on the pivotal frame, contact of said lug and spur serving to prevent more than a positive predetermined amount of forward travel on the part of said plate and frame. While the plate-spur is preferred in order to obtain more contact with the tilt-plate lug, the same result would be attained were said spur omitted.

Like in the former patent a spiral spring P is connected at its ends to the tilt-plate and pivotal frame to have the same operation and functions set forth in said patent. Provision similar to that set forth in the aforesaid patent is had for tension-adjustment of the spring.

The arbor I is herein illustrated devoid of the collar shown in the former patent, said arbor being reduced at one end to form an annular shoulder u, against which to abut a washer w, opposing the inner side of the auxiliary grinding-wheel Q, the outer side of this wheel being opposed by another washer w' against a nut x, run on a screw-thread cut upon the reduced end of said arbor.

The pinion L has sliding fit on the arbor I and is provided with an outer side recess for engagement of a stud y, projecting from said arbor at a right angle thereto, this stud being a pin having driving fit in an arbor, recess. An inner hub extension z of the pinion is shown as having an annular corrugated or wave surface abutting an end of grinding-wheel N, the latter being tightened against this hub extension of the aforesaid pinion by a nut R, engaging a screw-thread b' on the greatest diameter of said arbor, the latter being reduced to the depth of the screw-thread between the latter and the aforesaid shoulder. By having the corrugated or wave surface of the pinion a better grip is had against the grinding-wheel N, and therefore the latter is less liable to slip on its arbor.

Like in the former patent, the pinion L is given a greater width of face than the spur-wheel J and provision is had for play of arbor I in its bearing, so that the grinding-wheel N on said arbor may automatically adjust itself to knife-sections of a sickle-bar supported on the machine-base.

One bearing for the arbor is integral with a pinion-guard S, constituting part of one section T of the aforesaid pivotal frame, and the bore of this bearing is shown tapered in order that said arbor may have adjustment to correct its angle. The other bearing for arbor I is at the lower end of the other section T' of the pivotal frame, this latter frame-section being in the form of an arm having elongated openings and under-side transverse grooves.

Bolts U extend up through apertures in frame-section T to engage the elongated openings in the other frame-section T', and set-nuts V are run on the bolts against the latter frame-section. A transverse rib c' on frame-section T engages any one of the grooves in frame-section T', the rib constituting a fulcrum, and from this description and the showing in Fig. 1 it will be evident that longitudinal and tilt adjustments of the latter frame-section may be had to correct the angle of the arbor I aforesaid. If found more convenient or desirable in practice, the rib c' may be on the frame-section T' and the grooves in the opposing frame-section.

The reduced end of arbor I extends beyond the pivotal frame-section to receive the auxiliary grinding-wheel Q, held in place by the means above specified, this grinding-wheel not being positioned when the machine is employed for grinding knife-sections of a sickle-bar. It is also to be understood that when the grinding-wheel Q is employed the tilt-plate is swung full back and held by the dog f, above specified, the elevation of said grinding-wheel being varied by adjustment of the set-screw M, above specified.

As illustrated in Fig. 7, the base A may be provided with clearance-space k' for the front lower lug k of tilt-plate F, so that the latter may have greater forward throw to economize space in knockdown shipment of the machine, when the pivotal frame and parts in connection therewith are detached.

Having thus described my invention, what I claim as new, and desire to secure by Letters Patent, is—

1. The sickle-bar clamp-plate provided with a forwardly-extended longitudinally-slotted central handle, lugs depending from said plate and handle to rest upon the machine-base, the handle-lug constituting a fulcrum upon which to tilt the aforesaid plate, a bolt engaging the machine-base and handle-slot, and a nut on the bolt in opposition to the aforesaid handle.

2. The tilt-plate provided with a front lower lug, a pivotal dog arranged to be brought into opposition to said lug when the tilt-plate has full rear throw, and means for limiting this rear throw of said tilt-plate.

3. The tilt-plate provided with rearwardly-extending flanges and a transverse rear seat, the pivot-rod for the grinding-wheel frame engaging said seat to project rearward therefrom, and a handle bolted to the tilt-plate between the flanges thereof against said pivot-bolt, the latter being held fast in its seat by the pressure of the handle.

4. The tilt-plate having its upper end in the form of an elongated hook, and provided with rearwardly-extended flanges, the pivot-rod engaging the hook, the handle arranged between the flanges and clamped to said tilt-plate against said pivot-rod, and the grinding-wheel frame in loose engagement with the aforesaid pivot-rod.

5. The tilt-plate provided with the upper forwardly-extending stop-lug in position to limit forward travel of said plate and grinding-wheel frame in pivotal connection therewith.

6. The pinion provided with a hub extension having an annular irregular surface opposed to the adjacent end of the grinding-wheel on the pinion-carrying arbor, and a clamp-nut run on said arbor against the outer end of said grinding-wheel.

7. The two-part pivotal frame having one section thereof provided with a fulcrum for the other section, the latter section being held in adjusted position on said fulcrum by suitably-arranged bolts and set-nuts.

8. The two-part pivotal frame having one section thereof provided with a transverse rib constituting a fulcrum, the other section provided with transverse grooves any one of which may be engaged by said fulcrum, one of said sections being also provided with elongated openings for engagement of bolts fitting apertures in the other section and having set-nuts run thereon.

In testimony that I claim the foregoing I have hereunto set my hand in the presence of two witnesses.

JOHN GILSON.

Witnesses:
   H. W. BOLENS,
   T. A. DOERNER.